May 26, 1964 D. W. BYRNES 3,134,359
EGG COLLECTING AND COUNTING MEANS
Original Filed Jan. 30, 1958 2 Sheets-Sheet 1

INVENTOR
DENNIS W. BYRNES
BY Dean Lawrence
ATTORNEY

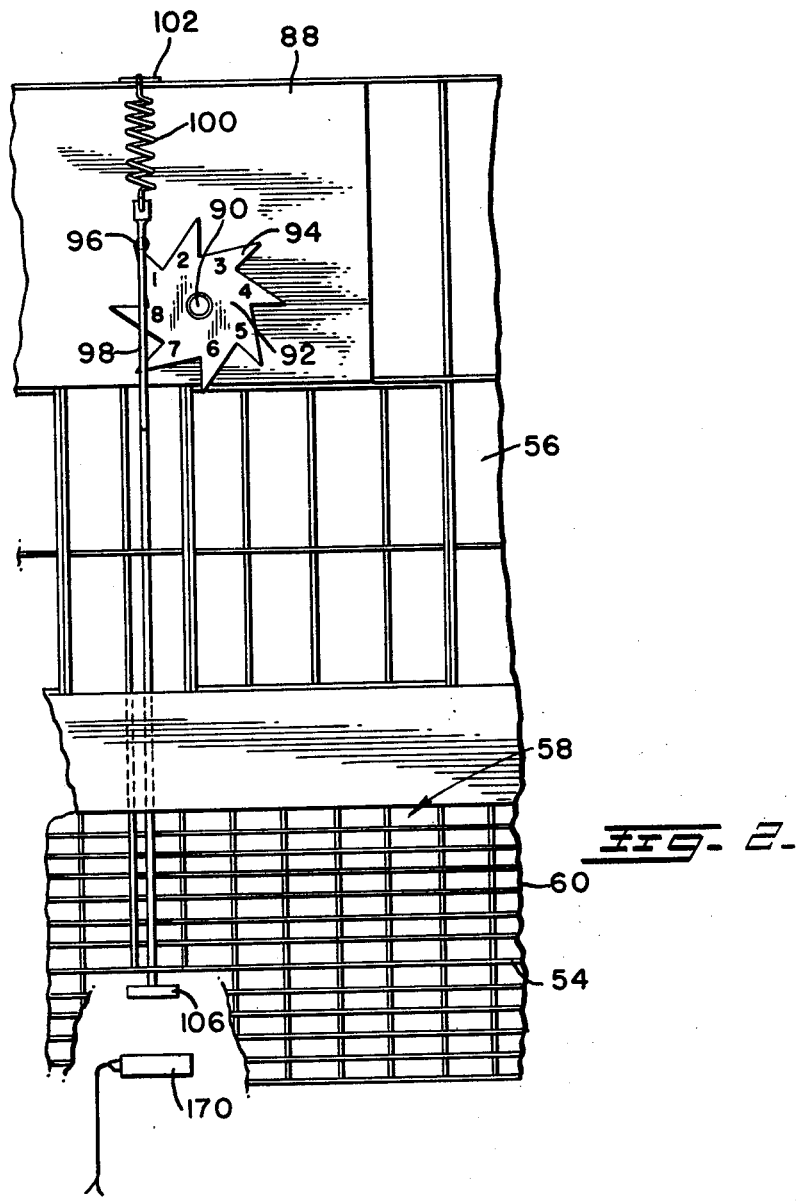

3,134,359
EGG COLLECTING AND COUNTING MEANS
Dennis W. Byrnes, 4565 S. 6th St., Tucson, Ariz.
Original application Jan. 30, 1958, Ser. No. 712,118, now Patent No. 3,045,612, dated July 24, 1962. Divided and this application Sept. 27, 1961, Ser. No. 146,677
5 Claims. (Cl. 119—48)

The present invention relates to animal husbandry, and more particularly relates to apparatus for the husbandry of laying hens, including egg collecting and counting means, and this application is a division of copending application Serial No. 712,118, filed January 30, 1958, now United States Patent 3,045,612, dated July 24, 1962.

An object of the invention is to provide an animal husbandry system including a plurality of hen cages movable in an endless path and an egg collecting and counting station mounted adjacent the endless path including means for removing the eggs from the cages and controlling a dial on each cage which displays the total of eggs removed from that cage.

Further objects and advantages of the invention will be apparent upon reference to the following specification and drawings, wherein:

FIGURE 2 is a fragmentary longitudinal elevation view of a portion of the egg counting device illustrated in FIGURE 1.

Figure 1:
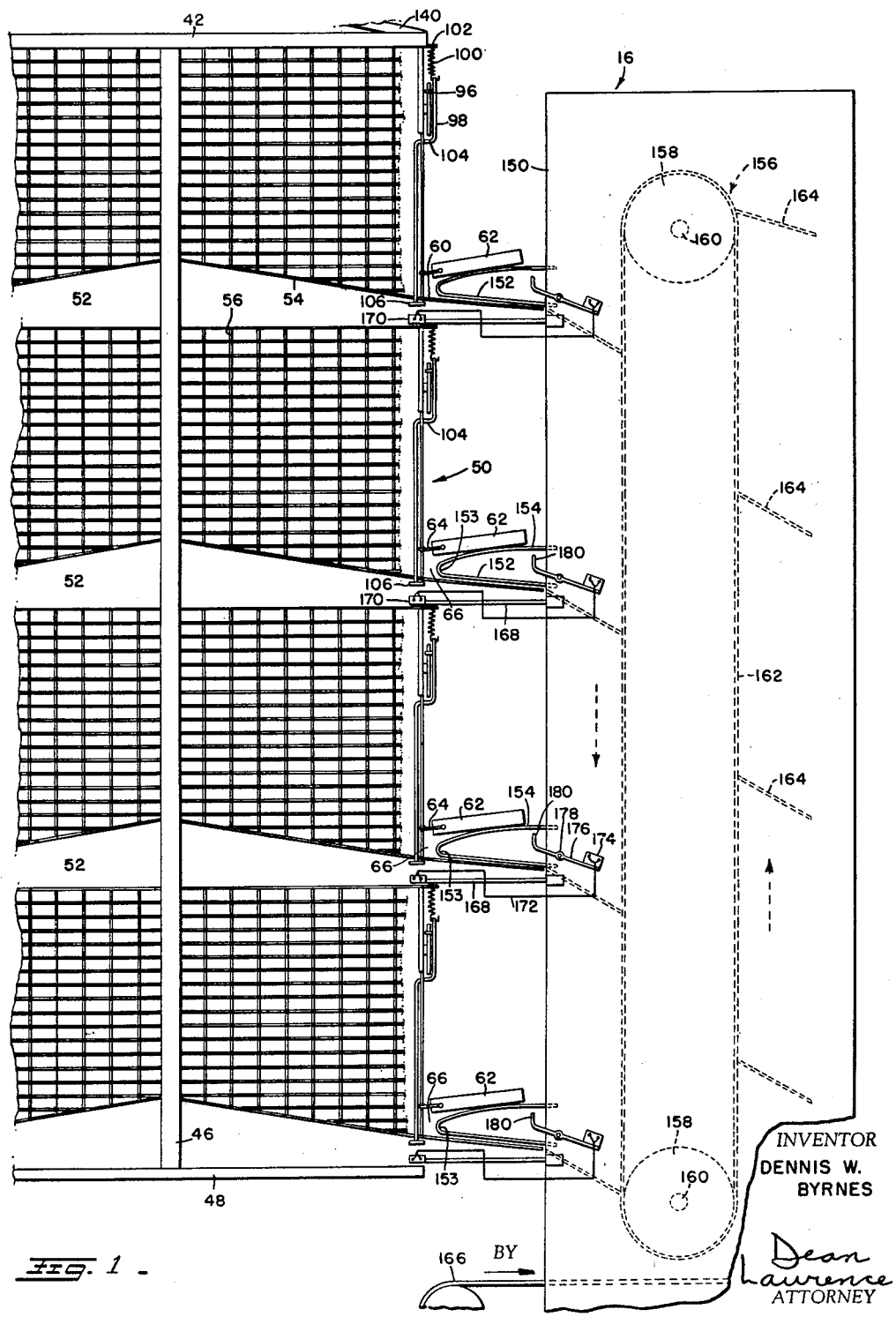
FIGURE 1 is a transverse vertical view showing an egg collecting and counting station employed in accordance with the principles of the invention.

The animal husbandry apparatus and system illustrated in the drawings is adapted for laying hens such as chicken hens. The apparatus includes a plurality of horizontally-spaced cage assemblies 12 each rotatably suspended from and driven by an endless conveyor generally indicated by the numeral 14. Adjacent the endless path of movement of the cage assemblies, a number of cage servicing stations are located. These servicing stations include a pair of egg collecting and counting stations 16.

To form a support for the groups of cages, a pair of vertical central support members 46 extend downwardly from the middle of bars 42. As seen in FIGURE 1, a cage bottom 48 is secured to the lower ends of central support bars 46. A plurality of vertically spaced cage groups 50 are secured to bars 46 and extend outwardly therefrom with spaces 52 between vertically-spaced cage groups 50. Each cage group 50 can include a plurality of horizontally-adjacent cages. The cages are formed of wire mesh sides, ends, and bottoms. The mesh of the bottoms 54 is chosen of the proper fineness so that the manure droppings of the hens passes through the mesh but the eggs will roll freely on the bottoms as seen in the lower portion of FIGURE 2. The sides 56 of the cages are formed of wider mesh than the bottoms 54, as seen in the upper portion of FIGURE 2, so that the hens can project their heads and necks out through the openings to feed and water themselves. Each side 56 of a cage group 50 terminates a distance above the bottom 54 to produce an opening 58 at the bottom of the side 56. The bottom 54 is secured to the central support bars 46 and extends inclinedly downwardly and outwardly therefrom for a distance beyond the side 56 to form an egg tray 60. An egg guard 62, formed of a material such as a synthetic resin plastic that will not shatter eggs on impact, extends along the egg tray 60. Connecting links 64 pivotally connect the ends of the egg guard 62 to the corners of each cage in the cage group 50 at points above the bottom 54 so that there is always an aperture 66 between the ends of the egg guard 62 and the egg tray 60.

On a side of each cage in each cage group 50, means are provided for displaying the cumulative total of eggs removed from the cage. This means includes, as seen in FIGURE 10, a plate 88 secured to the side of the cage, a pin 90 secured to the plate 88 and extending outwardly therefrom, and a dial 92 rotatably but frictionally tightly mounted on pin 90 and having ratchet teeth 94 around the circumference. Successive numerals are marked adjacent each ratchet tooth 94, the uppermost numeral indicating the current cumulative total of eggs removed from the cage. The dial 92 is rotated in a step-by-step fashion by a pawl 96 secured to and extending from a rod 98. A tension spring 100 extends from the upper end of rod 98 to a plate 102 secured to plate 88 and urges the rod and pawl upwardly, as seen in FIGURE 10, out of engagement with ratchet teeth 94. The rod 98 has a horizontal offset portion 104, as seen in FIGURE 9 and a magnetically-responsive armature 106 secured to its lower end. The armature is attracted by an electromagnet, later described to cause a lowering of rod 98 and pawl 96 to advance dial 92 to display the next higher numeral in the uppermost indicating position.

Each egg collecting and counting station 16 includes an enclosure 150. A plurality of egg guard lifters 152 have their ends secured to the enclosure 150. Each egg guard lifter has an outer end 153 adapted to enter the aperture 66 between the egg guard 62 and the egg tray 60. Each egg guard lifter 152 has a narrow leading edge that is freely received in the aperture 66 between the ends of the moving egg guard 62 and egg tray 60 and has an upper contour 154 extending upwardly and outwardly in the direction of travel of the moving egg tray 60 to effect a lifting of the egg guard 62. For receiving the eggs from the egg trays, a vertical conveyor generally indicated 156 moves within the enclosure 150. The conveyor includes two drive wheels 158 rigidly mounted on shafts 160 rotated by conventional means such as an electric motor (not shown). A flexible conveyor belt 162 is wove around drive wheels 158 and is continuously driven thereby. The conveyor belt 162 has spaced rigid flights 164 extending outwardly therefrom for receiving eggs from the egg trays 60. The direction of movement of the flights 164 is shown by the dotted arrows in FIGURE 1. A horizontal conveyor 166 extends beneath vertical conveyor 156 to receive eggs therefrom and convey the eggs to adjacent rooms for further processing such as candling and packaging.

Control means are mounted on the enclosure 150 shown in FIGURE 1 for causing the rotation of each egg-indicating dial 92 on each cage in response to the passage of an egg from the egg tray 60 to the vertical conveyor flight 164. Each control means includes a support arm 168 extending outwardly from enclosure 150 and having an electromagnet 170 secured to its outer end at a position just beneath the path of movement of armature 106. The electromagnet 170 is supplied with electric current through lead 172 extending from micro-matic switch 174. The switch receives electric power from a conventional source (not shown) and is controlled by a lever 176 pivoted at 178. The lever has an up-turned end 180 to be engaged and rotated upwardly by an egg passing from egg tray 60 to a vertical conveyor flight 164. The switch 174 is of a commercially available type that, upon clockwise pivoting of lever 176 as seen in FIGURE 1, sends a pulse of electric current of predetermined duration of time to the electromagnet 170. After the expiration of the predetermined duration of time, the flow of current to the electromagnet 170 automatically ceases.

In operation, as the cage assembly reaches an egg collecting and counting station 16, the outer end 153 of each egg guard lifter 152 enters the aperture 66 between the egg guard 62 and the egg tray 60. Further movement of the cage assembly causes the egg guard to ride up on the contour 154 of the egg guard lifter.

This releases the egg which falls off the egg tray 60, pivots the up-turned end 180 of lever 176 clockwise as seen in FIGURE 1, and falls onto the flight 164 of vertical egg conveyor 156. The vertical egg conveyor carries the eggs down to horizontal egg conveyor 166 which removes them to an adjacent room for further processing.

The pivoting of lever 176 initiates the action of switch 174 to send an electric pulse to electromagnet 170. The energized electromagnet draws armature 106, rod 98 and pawl 96 downwardly against the tension of spring 100 to rotate dial 92 one step and display the next higher numeral indicating the total number of eggs removed from that cage.

The invention may be embodied in other specific forms without departing from the spirit or essential characteristics thereof. The present embodiments are therefore to be considered in all respects illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for animal husbandry comprising: an endless conveyor; a plurality of horizontally-spaced animal cages carried by said endless conveyor in an endless path, each said cage having a bottom inclined downwardly toward the side of the cage and extending for a distance beyond the side of said cage to form an egg tray, each said cage having in its side an opening in the lower portion of said side so that eggs can roll down said inclined bottom through said opening onto said egg tray; an egg guard movably mounted adjacent the outer edge of each said egg tray for releasably restraining eggs from rolling off said egg tray; a stationary egg collecting station mounted adjacent said endless path; an egg guard releaser mounted on said egg collecting station and extending into the path of said egg guard to raise said egg guard from egg restraining position when a cage is moved past said egg collecting station; an egg receiver in said egg collecting station for receiving eggs from said egg tray when said egg guard releaser raises said egg guard from egg restraining position.

2. Apparatus for animal husbandry comprising: a conveyor; an animal cage carried by said conveyor in a path; said cage having a bottom inclined downwardly toward the side of the cage and extending for a distance beyond the side of said cage to form an egg tray; said cage having an opening in the lower portion of its side so that eggs can roll down said inclined bottom through said opening onto said egg tray; a substantially vertical egg guard having its middle portion resting on said egg tray adjacent the outer edge thereof for releasably restraining eggs from rolling off said egg tray; said egg guard having end portions extending inwardly and upwardly to form apertures between said end portions and a said egg tray, said egg guard having ends pivotally secured to the side of said cage; an egg collecting station fixedly mounted adjacent said path of cage movement; an egg guard lifter mounted on said egg collecting station and having an outer end positioned in said path of cage movement at a point to enter said apertures between the end portions of said egg guard and said egg tray, said egg guard lifter having an upper contour extending upwardly and along the path of movement of said cage for raising said egg guard from egg restraining position when said cage is moved past said egg collecting station; an egg receiver in said egg collecting station for receiving eggs from said egg tray when said egg guard lifter moves said egg guard from egg restraining position.

3. Apparatus for animal husbandry as set forth in claim 2, wherein said egg receiver includes a vertical egg conveyor having horizontal flights for receiving eggs movable vertically past the position occupied by said egg tray as said cage is moved past said egg collecting station.

4. Apparatus for animal husbandry as set forth in claim 3, including a horizontal egg conveyor located beneath said vertical egg conveyor and receiving eggs dropped from the flights of said vertical egg conveyor.

5. In an animal husbandry device in which a plurality of vertically spaced cages housing laying hens are conveyed upon an endless conveyor, each of said cages including an inclined egg tray for receiving eggs laid by said hens housed in said cages, an egg guard for releasably restraining said eggs on said egg tray, and egg counting means, an egg collecting station adjacent said endless conveyor comprising: egg guard actuator means mounted at said station for simultaneously raising the egg guard on each cage to release the eggs on said egg trays permitting said eggs to roll therefrom; means for receiving said eggs as said eggs roll from said egg trays; and means disposed in the path of and actuated by each of said eggs in rolling from a respective egg tray for operating said counting means secured to each of said cages whereby the eggs from each cage are collected and counted.

References Cited in the file of this patent
UNITED STATES PATENTS

| | | |
|---|---|---|
| 2,257,734 | Cornell | Oct. 7, 1941 |
| 2,827,875 | Baumstark | Mar. 25, 1958 |
| 2,886,173 | Scott | May 12, 1959 |